United States Patent
Kazmi et al.

(10) Patent No.: US 10,243,611 B2
(45) Date of Patent: Mar. 26, 2019

(54) ADAPTIVE CELL SEARCH, IN PARTICULAR UNDER EXTENDED COVERAGE

(71) Applicant: Telefonaktiebolaget LM Ericsson (publ), Stockholm (SE)

(72) Inventors: Muhammad Kazmi, Sundbyberg (SE); Joakim Axmon, Malmö (SE); Bengt Lindoff, Bjärred (SE); Santhan Thangarasa, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/505,704

(22) PCT Filed: Nov. 9, 2016

(86) PCT No.: PCT/SE2016/051100
§ 371 (c)(1),
(2) Date: Feb. 22, 2017

(87) PCT Pub. No.: WO2017/082804
PCT Pub. Date: May 18, 2017

(65) Prior Publication Data
US 2017/0279487 A1 Sep. 28, 2017

Related U.S. Application Data

(60) Provisional application No. 62/252,872, filed on Nov. 9, 2015.

(51) Int. Cl.
*H04W 36/08* (2009.01)
*H04B 1/7083* (2011.01)
(Continued)

(52) U.S. Cl.
CPC ......... *H04B 1/7083* (2013.01); *H04B 1/7087* (2013.01); *H04J 11/0086* (2013.01);
(Continued)

(58) Field of Classification Search
CPC .. H04B 1/7083; H04J 11/0086; H04W 36/36; H04W 88/08; H04W 48/20; H04W 48/16; H04W 36/04; H04W 36/0083
(Continued)

(56) References Cited

U.S. PATENT DOCUMENTS

2012/0115487 A1* 5/2012 Josso ............... H04W 36/30
455/437
2012/0276909 A1 11/2012 Xiao et al.
(Continued)

FOREIGN PATENT DOCUMENTS

EP 2639982 A1 9/2013

OTHER PUBLICATIONS

3GPP, "3rd Generation Partnership Project; Technical Specification Group GSM/EDGE Radio Access Network; Cellular system support for ultra-low complexity and low throughput Internet of Things (CIoT) (Release 13)", 3GPP TR 45.820 V13.0.0 (Aug. 2015), Aug. 2015, 1-495.
(Continued)

*Primary Examiner* — Phuoc H Doan
(74) *Attorney, Agent, or Firm* — Sage Patent Group

(57) ABSTRACT

The disclosure pertains to a method for operating a user equipment (10), UE, in a wireless communication network, the method comprising performing a cell identification procedure based on a comparison between a signal quality of a first cell and the signal quality of a second cell.
The disclosure also pertains to related devices and methods.

14 Claims, 13 Drawing Sheets

(51) Int. Cl.
| | |
|---|---|
| H04B 1/7087 | (2011.01) |
| H04J 11/00 | (2006.01) |
| H04W 36/36 | (2009.01) |
| H04W 48/16 | (2009.01) |
| H04W 48/20 | (2009.01) |
| H04W 88/08 | (2009.01) |
| H04W 36/00 | (2009.01) |
| H04W 48/00 | (2009.01) |

(52) U.S. Cl.
 CPC .......... *H04W 36/00* (2013.01); *H04W 36/36* (2013.01); *H04W 48/00* (2013.01); *H04W 48/16* (2013.01); *H04W 48/20* (2013.01); *H04W 88/08* (2013.01)

(58) Field of Classification Search
 USPC .............................. 455/442, 436, 437, 404.1
 See application file for complete search history.

(56) References Cited

U.S. PATENT DOCUMENTS

2013/0157608 A1\* 6/2013 Chuang ................ H04W 48/20
 455/404.1
2014/0038616 A1\* 2/2014 Burbidge .............. H04W 36/18
 455/442

OTHER PUBLICATIONS

Unknown, Author, "Further simulation results on cell search requirements for HD-FDD low complexity", 3GPP TSG-RAN WG4 Meeting #73 R4-147549 San Francisco, CA, USA Source: Ericsson, Nov. 17-21, 2014, 1-2.

Unknown, Author, "RRM issues analysis in UE connected state in DRX", 3GPP TSG-RAN WG4 Meeting #76bis R4-155792 Sophia Antipolis, France, Source: Huawei, HiSilicon, Oct. 12-16, 2015, 1-8.

Unknown, Author, "3rd Generation Partnership Project; Technical Specification Group Radio Access Network; Evolved Universal Terrestrial Radio Access (E-UTRA); Requirements for support of radio resource management (Release 13)", 3GPP TS 36.133 V13. 1.0, Sep. 2015, 1430 pages.

\* cited by examiner

ADAPTIVE CELL SEARCH, IN PARTICULAR UNDER EXTENDED COVERAGE

TECHNICAL FIELD

The present disclosure pertains to wireless communication technology, in particular cell search, e.g. in an M2M environment and/or involving a UE with low complexity.

BACKGROUND

Modern wireless communication technology is developing fast to cover a plethora of possible use cases. Communication in particular has to be possible and efficient in a wide range of coverage scenarios, and should also be available for device with limited (cheap) radio capabilities. In particular for such device, it may be challenging to find and identify cells of wireless communication networks, which is particularly important in the context of handover processes.

SUMMARY

It is an object of the present disclosure to provide approaches allowing reliable and flexible cell identification even in situations with bad coverage, e.g. low signal quality or low received power from cells to be identified.

Accordingly, there is disclosed a method for operating a user equipment, UE, in a wireless communication network. The method comprises performing a cell identification procedure based on a comparison between a signal quality of a first cell and the signal quality of a second cell. This approach allows adapting the cell identification procedure (also referred to as CI procedure) to deal with different coverage situation, and for example to identify even weakly received cells which otherwise might be overshadowed by a serving cell.

The method may comprise performing the cell identification procedure based on one or more parameters. In some variants, a parameter of the one or more parameters is a time and/or delay parameter, e.g. a parameter pertaining to a measurement time, e.g. a minimum measurement time, and/or a time allowed to measure on a cell. The parameter/s may define the procedure. With time as a parameter, it is possible, for example, to provide sufficient measurement time to identify even weak second cells.

Alternatively or additionally, it may be considered that performing the cell identification procedure based on the comparison comprises adapting the procedure, in particular based on the comparison. Thus, the procedure may be changed, e.g. in one or more parameters, to adapt to different scenarios, in particular coverage scenarios.

Further alternatively or additionally, performing the cell identification procedure based on the comparison may comprise choosing or selecting between a first and a second procedure based on the comparison. Different procedure may generally differ regarding one or more parameters.

Signal quality may be represented by SNR and/or SINR and/or CQI and/or RSRQ and/or and/or CRS Ês/Iot and/or SCH Ês/Iot.

There may also be considered a user equipment, UE, for a wireless communication network. The UE is adapted for performing a cell identification procedure based on a comparison between a signal quality of a first cell and the signal quality of a second cell. The UE may comprise an identification module for performing the cell identification procedure. It may be considered that the UE is adapted for performing, and/or comprises a comparing module for performing, the comparison.

The UE may be adapted for performing the cell identification procedure based on one or more parameters. It may be considered that a parameter of the one or more parameters is a time and/or delay parameter, e.g. a parameter pertaining to a measurement time, e.g. a minimum measurement time, and/or a time allowed to measure on a cell.

Performing the cell identification procedure based on the comparison may comprise adapting the procedure, e.g. based on the comparison. The UE may be adapted for such performing and/or comprise an adapting module for such adapting.

It may be considered that performing the cell identification procedure based on the comparison comprises choosing or selecting between a first and a second procedure, e.g. based on the comparison. The UE may be adapted for such performing and/or comprise a selecting module for such choosing or selecting. The cell identification procedure may be performed on the second cell, or on a further cell, e.g. a third cell, e.g. to detect and/or identify this second or further/third cell.

Generally, the signal quality may be represented by SNR and/or SINR and/or CQI and/or RSRQ and/or and/or CRS is/Iot and/or SCH is/Iot.

Moreover, there may be considered a network node for a wireless communication network. The network node is adapted for configuring a user equipment for performing any or any one of the methods for operating a user equipment described herein. It may be considered that the network node comprises a configuring module for such configuring.

A method for operating a network node in a wireless communication network may be considered. The method comprises configuring a user equipment for performing any and/or any one of the methods for operating a user equipment described herein.

Also, there is disclosed a program product comprising code executable by control circuitry. The code causes the control circuitry to carry out and/or control any or any one of the methods described herein. Code may comprise and/or represent instructions.

A carrier medium carrying and/or storing a program product as described herein may be considered.

A comparison may generally be implicit, and/or the comparison (respectively, an indication of the comparison or its result) may be indicated (e.g., transmitted and/or configured) to the terminal or UE, e.g. by another terminal or UE or a network node. The terminal or UE and/or may receive such an indication, and/or be adapted for, and/or comprise receiving circuitry (e.g., as part of radio circuitry) and/or a receiving module, for receiving such an indication.

Adapting (a CI procedure) may comprise choosing and/or using one or more parameters, e.g. based on a table. Generally, performing a CI procedure may be based on and/or comprise performing on or more (UE) measurements, in particular (radio) measurements as disclosed herein, e.g. on signals from the cell, e.g. pilot and/or reference signals, and/or evaluating a determined or obtained signal strength and/or performing synchronization and/or timing determination pertaining for the cell the procedure pertains to, and/or determining a PCI for the cell. Measurement/s may pertain to and/or provide the signal strength and/or a signal quality. Performing a CI procedure may be based on a signal quality of the second cell the comparison is based on and/or corresponding measurements, thus including information already available. However, in some variants such information may be included, e.g. depending on the type of signals used for determining the signal quality and for the CI procedure (which may be different types of signals), and/or depending on a delay between comparison and performing the CI procedure. A cell identification procedure may comprise, and/or be implemented as a cell search or cell search procedure.

Cell identification information may be based on a performed cell identification procedure, e.g. be a result thereof and/or be determined based on a result. A CI procedure may provide cell identification information, e.g. indicating and/or pertaining to timing and/or synchronization and/or cell identity, e.g. PCI.

The second cell may generally be a neighbor and/or potential neighbor cell, e.g. a cell not yet identified, which may become detectable and/or available for the UE. Alternatively, the second cell may be a cell already detected and/or identified, e.g. as a neighbor cell.

A table may generally be stored in a memory of the UE and/or be accessible for and/or readable by the UE and/or control circuitry of the UE.

The UE may be in or operate in, and/or be adapted for, more than one coverage enhancement level.

Signal quality may comprise and/or be represented and/or indicated by SNR, SINR, CQI, RSRQ, CRS Ês/Iot, SCH Ês/Iot etc. Alternatively or additionally, signal quality may be represented by and/or comprise and/or pertain to and/or be indicated by signal strength. Signal strength may be represented by, and/or comprise and/or be indicated by, path loss, RSRP, SCH_RP etc.

The first cell may be a cell already identified by the UE.

BRIEF DESCRIPTION OF THE DRAWINGS

The drawings are provided to illustrate and elucidate the approaches and concepts described herein, and are not intended to limit their scope unless explicitly stated otherwise.

The drawings comprise

DETAILED DESCRIPTION

Figure 1A:
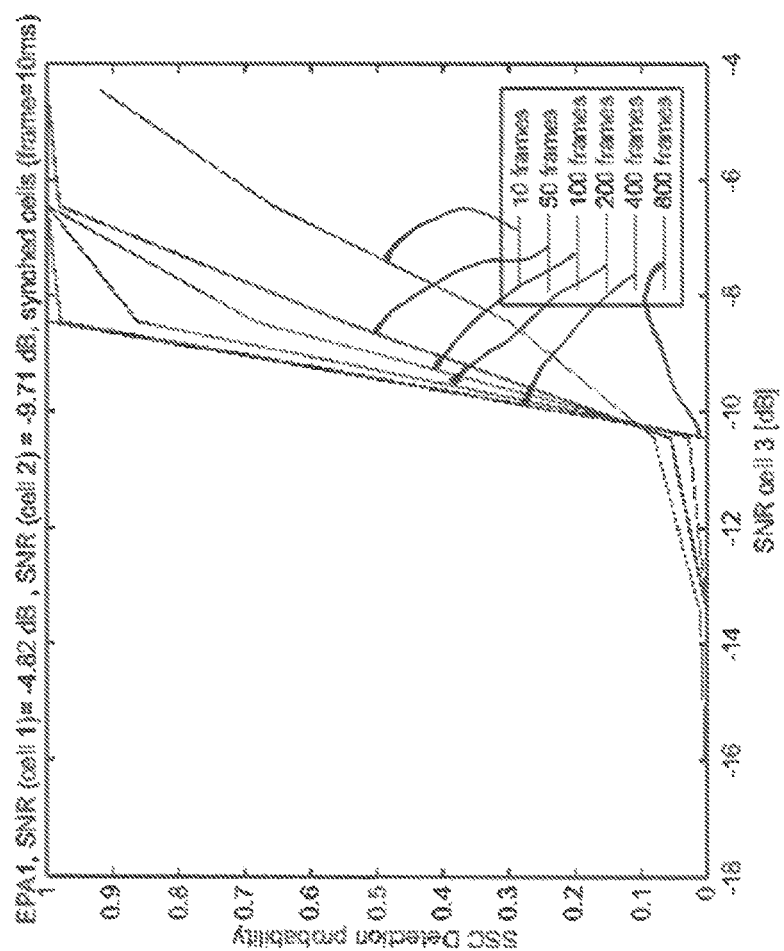
FIG. 1 (*a/b*), showing simulation results regarding cell search.

Concepts and approaches described herein generally are explained by way of example in the context of a LTE-based system. However, they are applicable with other kinds of RAT/N (Radio Access Technology/Network), e.g. in the context of 5G and/or 3GPP standardized technology.

Machine-to-machine (M2M) communication (also sometimes referred to as machine type communication (MTC)) is used for establishing communication between machines and between machines and humans. A M2M device may in the context of this disclosure be seen as, and/or represent, a user equipment (UE). The communication may comprise of exchange of data, signaling, measurement data, configuration information etc. Devices involved may be of any size, e.g. from that of a wallet to that of a base station. M2M devices may be used for applications like sensing environmental conditions (e.g. temperature reading), metering or measurement (e.g. electricity usage etc.), fault finding or error detection, etc.

Generally, M2M applications may lead to the M2M device/s being active (respectively transmitting and/or receiving, in particular user data and/or payload data) only (comparatively) rarely and/or for short periods, e.g. over a consecutive duration depending upon the type of service; and/or they may be active at specific times and/or for specific time intervals, e.g. pre-determined and/or periodically, in particular such that their times of activity are short (e.g. 10% or less) in comparison to a larger time interval/frame, in particular the time interval of their periodicity (which may be called transmitting periodicity, e.g. the periodicity with which the M2M device/UE is expected to transmit and/or communicate, e.g. user and/or payload data).

For example, a M2M device may be active e.g. about 200 ms once every 2 seconds, about 500 ms every 60 minutes etc. A M2M device may be adapted to perform and/or perform measurement/s (in particular, related to (wireless) communication, e.g. as opposed to other measurements it performs regarding its nature as a sensor; the possibility that a M2M device intended as a wireless communication-related sensor which uses wireless communication for reporting its sensoring results notwithstanding and not being excluded, in particular on more than one frequency/other frequencies (respectively carrier/carriers) and/or other RATs. User and/or payload data of a M2M device may be data not pertaining to the communication process itself, and may in particular comprise sensor data and/or a report, e.g. regarding sensoring and/or operation of the UE/M2M device, e.g. operation not pertaining to the communication of the report.

A M2M/MTC device may be expected to be of low cost and low complexity. A low complexity UE envisaged for M2M operation may implement one or more low cost features (compared to a device fully complying with a telecommunication standard like LTE, for example) like smaller downlink and uplink maximum transport block size (e.g. 1000 bits) and/or reduced downlink channel bandwidth of 1.4 MHz for data channel (e.g. PDSCH). A low cost UE may also comprise a half-duplex (HD-FDD) and one or more of the following additional features: single receiver (1 Rx) at the UE, smaller downlink and/or uplink maximum transport block size (e.g. 1000 bits) and reduced downlink channel bandwidth of 1.4 MHz for data channel. A low cost UE may also be referred to as low complexity UE. A UE or M2M device may be a low cost UE.

Coverage enhancing in machine type communication is discussed in the following.

The path loss between an M2M device and a base station may be very large in some scenarios, such as when a M2M device is used as a sensor or metering device located in a remote location, for example in the basement of a building. In such scenarios, the reception of signals from a base station may be very challenging. For example, the path loss can be worse than 20 dB compared to normal operation (e.g., the use of UEs for having voice calls in a wireless network in a well-covered area). In order to cope with such challenges, the coverage in uplink and/or in downlink may be enhanced with respect to the normal coverage (legacy coverage). This may be realized by employing one or a plurality of advanced techniques in the UE and/or in the radio network node (e.g. base station and/or relay node) for enhancing the coverage. Some non-limiting examples of such advanced techniques are (but not limited to) transmit power boosting, repetition of transmitted signal, applying additional redundancy to the transmitted signal, use of advanced/enhanced receiver, etc. In general, when employing such coverage enhancing techniques, the M2M is regarded to be operating in 'coverage enhancing mode' or coverage extending mode. A UE, e.g. low complexity UE (e.g. UE with 1 Rx) may also be adapted to support an enhanced coverage mode of operation and/or for any one or combination of coverage enhancing techniques.

The coverage level of the UE with regards to a cell and/or carrier and/or frequency may be expressed in terms of signal level such as signal quality and/or signal strength and/or path loss with regard to that cell and/or carrier and/or frequency. Enhanced coverage techniques may in particular be implemented for static and/or semi-static arrangements, e.g. if the UE/M2M devices is not expected to move for a long period of time; a long period of time may be at least 10×, at least 100× or at least 1000× longer than a transmitting/communication periodicity.

In the FDD configuration of LTE, DL subframe #0 and subframe #5 carry synchronization signals (i.e. both PSS and SSS). In TDD configurations, two pairs of synchronization signals per radio frame are carried by subframes 0 and 1, and 5 and 6, respectively. For the ease of presentation, the FDD configuration is discussed here. There are however no significant differences regarding cell search in FDD and TDD systems, hence the description can easily and analogously be adapted to TDD scenarios.

In order to identify an unknown cell (e.g. new neighbor cell), the UE has to acquire the timing of that cell (synchronization), and preferably or eventually the physical cell ID (PCI). Subsequently, the UE may also measure reference signaling like RSRP and/or RSRQ of the newly identified cell, for its own use (e.g., in case of UE-controlled mobility in idle mode) and/or to report the measurement to the network node. In total there are 504 PCIs defined for LTE.

Therefore, the UE may search or identify a cell (i.e. acquire PCI of the cell) by correlating the received PSS/SSS signals in DL subframe #0 and/or in DL subframe #5 with one or more of the pre-defined PSS/SSS sequences. The use of subframe #0 and/or in DL subframe #5 for PCI acquisition depends upon the UE implementation.

The UE may regularly attempt to identify neighbor cells on at least the serving carrier frequenc(ies) (of one or more cells it is configured for and/or served by). But it may also search cells on non-serving carrier(s), e.g. when configured by the network node to do so. In order to minimize UE power consumption, typically the UE searches in one of the DL subframes that carries synchronization signals, i.e., #0 or #5. In order to further save its battery power the UE searches for newly detectable neighbor cells on the intra-frequency carrier once every 40 ms in non-DRX or in short DRX cycle (e.g. up to 40 ms).

In longer DRX cycle the UE typically searches for newly detectable neighbor cells once every DRX cycle. During each search attempt the UE typically stores a snapshot of radio samples of 5-6 ms and post processes those samples by correlating the stored signals with the known PSS/SSS sequences. The reason for acquiring 5-6 ms of radio samples is that in case the neighbor cell(s) are not synchronous to the serving cell, the UE does not know where exactly to find the synchronization signal, but knows that there will be one such signal transmitted every 5 ms. In non-DRX the UE is able to identify an intra-frequency cell (including RSRS/RSRQ measurements) within 800 ms (i.e. 20 attempts in total including 15 and 5 samples, respectively, for cell identification (PCI acquisition) and RSRP/RSRQ measurement).

UE measurements are discussed in the following.

Measurements, which may be radio measurements, performed by/done by the UE, are typically performed on the serving as well as on neighbour cells over some known reference symbols or pilot sequences. The measurements may be performed pertaining to and/or done on cells on an intra-frequency carrier, inter-frequency carrier(s) as well as on inter-RAT carriers(s) (depending upon the UE capability whether it supports that RAT). To enable inter-frequency and inter-RAT measurements for the UE requiring gaps, the network has to configure the measurement gaps.

(Radio) measurements may be performed for various purposes. Some example measurement purposes are: mobility, positioning, self-organizing network (SON), minimization of drive tests (MDT), operation and maintenance (O&M), network planning and optimization etc. Examples of measurements in LTE are Cell identification aka PCI acquisition, Reference Symbol Received Power (RSRP), Reference Symbol Received Quality (RSRQ), acquisition of system information (SI), cell global ID (CGI) acquisition, Reference Signal Time Difference (RSTD), UE RX-TX time difference measurement, Radio Link Monitoring (RLM), which consists of Out of Synchronization (out of sync) detection and In Synchronization (in-sync) detection etc. CSI measurements performed by the UE are used for scheduling, link adaptation etc. by network. Examples of CSI measurements or CSI reports are CQI, PMI, RI etc. They may be performed on reference signals like CRS, CSI-RS or DMRS.

The measurements may be unidirectional (e.g., DL or UL) or bidirectional (e.g., having UL and DL components such as Rx-Tx, RTT, etc). Generally, performing measurements may comprise reporting such measurements, e.g. according to a measurement configuration, which may be configured by the network/network node. The DL subframe #0 and subframe #5 carry synchronization signals (i.e. both PSS and SSS). In order to identify an unknown cell (e.g. a new neighbor cell) the UE has to acquire the timing of that cell and eventually the physical cell ID (PCI). This is called as cell search or cell identification or even cell detection. Subsequently the UE also measures RSRP and/or RSRQ of the newly identified cell in order to use itself and/or report the measurement to the network node. In total there are 504 PCIs. The cell search is also a type of measurement.

The measurements may be done in all RRC states, e.g., in RRC idle and connected states.

A UE capable of operating in extended coverage may change coverage with respect to the serving cell over time. Therefore, it may have to operate in normal as well as in extended coverage with respect to the serving cell. The UE may also be expected to identify one or more new cells whose signal quality may vary depending on factors such as UE coverage level with respect the new cell to be identified. However, when the cell to be (newly) identified is very weak (e.g. signal quality is below a threshold) and/or significantly weaker than a cell already identified, e.g. a serving cell, then an existing cell search procedure may not be sufficient for identifying the cell and/or handover between cells may be difficult or impossible. A new mechanism to identify cells when there are very weak is suggested herein, which may allow the UE even for weak cells to operate in extended coverage and/or for a network node to handover to a (weak)

target cell, e.g. when the UE coverage wrt (with regards to) that cell is below a threshold and/or UE is in extended coverage wrt that cell.

There may generally be considered a method for operating a UE in a wireless communication network, the method comprising performing (e.g., by the UE), a cell identification procedure (e.g., for a second cell) based on a comparison between a signal quality (e.g., Q1) of a first cell and the signal quality (e.g., Q2) of a second cell and/or based on a DRX status of the UE (e.g., DRX or no-DRX operation). The method may comprise transmitting cell identification information (e.g. pertaining to the second cell) based on the performed CI procedure, e.g. to another UE and/or network node. This transmitting may e.g. utilize a D2D and/or direct transmission, e.g. to a UE.

There may be also considered a UE adapted for such method and/or a UE adapted for performing (e.g., by the UE), a cell identification procedure (e.g., for a second cell) based on a comparison between a signal quality (e.g., Q1) of a first cell and the signal quality (e.g., Q2) of a second cell and/or based on a DRX status of the UE (e.g., DRX or no-DRX operation). The UE may comprise a comparison module for providing the comparison and/or an identification module for performing the cell identification procedure and/or a DRX module for performing or switching between DRX or no-DRX). The UE may be adapted for, and/or comprise a transmitting module for, transmitting cell identification information (e.g. pertaining to the second cell) based on the performed CI procedure, e.g. to another UE and/or network node. This transmitting may e.g. utilize a D2D and/or direct transmission, e.g. to a UE.

The comparison may be based on and/or include determining a signal quality of a first cell and/or determining and/or obtaining a signal quality of the second cell. Alternatively or additionally, the comparison may include and/or be based on a relation between the signal qualities. The relation may be calculated and/or determined by the UE, which may comprise a corresponding relation module and/or be adapted therefore. Such a relation may e.g. represent a ratio and/or difference. The comparison may be determined based on the relation, e.g. by comparing it to a pre-determined condition or value, e.g. as provided by a table, and/or one or more thresholds. The comparison may be based on a DRX status of the UE and/or based on a coverage enhancement level of the UE, e.g. pertaining to the first and/or second cell.

The first cell may be a cell (already) identified by the UE and/or the UE is configured with and/or served on. The first cell may be provided and/or served by a network node, in particular a first network node.

Performing a cell identification (CI) procedure may be based on one or more parameters. Different procedures may be different regarding and/or in one or more such parameters. A parameter of a CI procedure may by a time and/or delay parameter, e.g. a parameter pertaining to a measurement time, e.g. a minimum measurement time, and/or a time allowed to measure on a cell. Performing a CI procedure based on the comparison may comprise adapting the procedure and/or choosing or selecting between a first and a second procedure, which may e.g. be distinguished by at least one such parameter being different. Adapting may comprise choosing and/or using one or more parameters, e.g. based on a table. Generally, performing a CI procedure may be based on and/or comprise performing on or more (UE) measurements, in particular (radio) measurements as disclosed herein, e.g. on signals from the cell, e.g. pilot and/or reference signals, and/or evaluating a determined or obtained signal strength and/or performing synchronization and/or timing determination pertaining for the cell the procedure pertains to, and/or determining a PCI for the cell. Measurement/s may pertain to and/or provide the signal strength and/or a signal quality. Performing a CI procedure may be based on a signal quality of the second cell the comparison is based on and/or corresponding measurements, thus including information already available. However, in some variants such information may be included, e.g. depending on the type of signals used for determining the signal quality and for the CI procedure (which may be different types of signals), and/or depending on a delay between comparison and performing the CI procedure.

Cell identification information may be based on a performed cell identification procedure, e.g. be a result thereof and/or be determined based on a result. A CI procedure may provide cell identification information, e.g. indicating and/or pertaining to timing and/or synchronization and/or cell identity, e.g. PCI.

The second cell may generally be a neighbor and/or potential neighbor cell, e.g. a cell not yet identified, which may become detectable and/or available for the UE."

A table may generally be stored in a memory of the UE and/or be accessible for and/or readable by the UE and/or control circuitry of the UE.

The UE may be in or operate in, and/or be adapted for, more than one coverage enhancement level.

Generally, performing the CI procedure may be based on a coverage enhancement level, which may be the (current) level the UE operates in.

In particular, there is disclosed a UE adapted for performing, and/or a method for operating a UE (which may be a method in a UE served by a first network node and/or configured with a first cell), which may comprise, one or more of the following steps:

determining (a signal quality (Q1) of at least a first cell (cell1), which may already be identified by the UE and/or for which the UE is configured and/or by which it is served; the UE may comprise a corresponding determining module; and/or obtaining a signal quality (Q2) of a (potential) second (neighbor) cell (cell2), which may be a cell to be identified by the UE; the UE may comprise a corresponding obtaining module; and/or determining a relation between at least Q1 and Q2; the UE may comprise a corresponding relation module; and/or adapting a cell identification procedure to identify the (potential) second cell2 based on the determined relation; the UE may comprise a corresponding adapting module;

Identifying cell2 based on the adapted procedure; the UE may comprise a corresponding identifying module; and/or;

(Optionally) using the results of the identification of cell2 for one or more radio operations.

Identifying a cell may generally comprise and/or be based on performing a CI procedure.

There may be considered a network node adapted for configuring the UE for any of the methods and/or CI procedure/s disclosed herein, e.g. by corresponding signaling and/or transmitting allocation data and/or a corresponding indication.

According to approaches described herein,
the UE is able to identify a cell regardless of the signal quality of the serving cell and/or of one or more already identified cells; and/or the UE cell identification behavior is well defined and is consistent even if there is a large variation between the signal quality of one or more already identified cells and the cell to be identified; and/or the method ensures that the UE can identify a very weak target cell even if the serving cell or other identified cells are stronger; and/or the method ensures that the UE can operate and identify cells when operating in extended coverage wrt the serving cell.

In some variants, the non-limiting terms UE or a wireless device are used interchangeably. The UE herein can be any type of wireless device capable of communicating with a network node or another UE over radio signals. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE) etc.

Also, in some variants the generic term "(radio) network node" is used. It can be any kind of a radio network node which may comprise any of base station, radio base station, base transceiver station, base station controller, network controller, RNC, evolved Node B (eNB), Node B, Multi-cell/multicast Coordination Entity (MCE), relay node, access point, radio access point, Remote Radio Unit (RRU) Remote Radio Head (RRH).

In some variants, the UE may be configured with a PCell (Primary Cell) and PSCell (Primary Secondary Cell) or with PCell, PSCell and one or more SCells (Secondary Cells), such as in dual connectivity and/or carrier aggregation. The first cell may be any of such cells, in particular a PCell or PSCell. The configured cells are UE specific and may be considered serving cells of the UE.

The UE may be served by a serving cell, which has already been identified by the UE. The UE further identifies at least one other cell, the second cell, which may be called a target cell or neighbor cell. In some variants, the serving cell and neighbor cell are served or managed by the first network node and a second network node, respectively. In some variants, the first or serving cell and second or neighbor cell are served or managed by the same network node e.g. a first network node.

The variants are applicable for a UE in a low or in high activity state. Examples of low activity state are RRC idle state, idle mode etc. Examples of high activity states are RRC CONNECTED state, active mode, active state etc. The UE may be configured to operate in DRX or in non-DRX and/or to switch between these states, e.g. based on a configuration and/or configuring by the network or a network node. If configured to operate in DRX, it may still operate according to non-DRX as long as it receives new transmissions from the network node.

The UE may operate under either normal coverage or enhanced coverage with respect to its serving cell. Enhanced coverage is also interchangeably called extended coverage. The UE may also operate in a plurality of coverage levels e.g. normal coverage, enhanced coverage level 1, enhanced coverage level 2, enhanced coverage level 3 and so on, which may be identified by differing operation conditions and parameters and/or different enhancement techniques. A coverage enhancement level may pertain to, and/or be referred to by, a SNR/SINR/SIR and/or signal level and/or a corresponding range of such.

The normal and extended coverage operations may typically take place on narrower UE RF (Radio Frequency) bandwidth (BW) compared with the system bandwidth, and/or cell BW, cell transmission BW, DL system BW etc. In some variants, the UE RF BW can be the same as of the system bandwidth. The system bandwidth may e.g. be determined by a standard and/or pertaining to a maximum or preferred bandwidth for the network node serving and/or providing the first cell. Examples of narrow RF BWs are 200 KHz, 1.4 MHz, etc. (they may be considered narrow if they are narrower than the system BW).

Examples of system BW are 200 KHz, 1.4 MHz, 3 MHz, 5 MHz, 10, MHz, 15 MHz, 20 MHz etc. In case of extended/enhanced coverage, the UE may be capable of operating under lower signal quality level (e.g. SNR, SINR, ratio of average received signal energy per subcarrier to total received power per subcarrier ($\hat{E}s/Iot$)), RSRQ etc) compared to its capabilities when operating in a legacy system. The coverage level enhancement may vary with the operational scenario and may also depend on the UE type. For example, a UE which is located in a basement with bad coverage may need larger level of coverage enhancement (e.g. 10 dB) compared to a UE which is at a cell border (e.g. 5 dB).

The coverage level may be expressed in terms of:
received signal quality and/or received signal strength at the UE wrt its serving cell and/or
received signal quality and/or received signal strength at the serving cell wrt the UE.

Signal quality may comprise and/or be represented and/or indicated by SNR, SINR, CQI, RSRQ, CRS $\hat{E}s/Iot$, SCH $\hat{E}s/Iot$ etc. Alternatively or additionally, signal quality may be represented by and/or comprise and/or pertain to and/or be indicated by signal strength. Signal strength may be represented by, and/or comprise and/or be indicated by, path loss, RSRP, SCH_RP etc.

The notation $\hat{E}s/Iot$ is defined as ratio of
$\hat{E}s$, which is the received energy per RE (power normalized to the subcarrier spacing) during the useful part of the symbol, i.e. excluding the cyclic prefix, at the UE antenna connector, to
Iot which is the received power spectral density of the total noise and interference for a certain RE (power integrated over the RE and normalized to the subcarrier spacing) as measured at the UE antenna connector RE refers to a resource element, which may comprise the smallest time-frequency resource unit defined for a standard, e.g. a subcarrier for a symbol time interval in LTE.

Consider an example of 2 coverage levels defined wrt signal quality (e.g. SNR) at the UE comprising of:
Coverage enhancement level 1 (CE1) comprising of SNR≥−6 dB at UE wrt its serving cell; and
Coverage enhancement level 2 (CE2) comprising of −12 dB≤SNR<−6 dB at UE wrt its serving cell.

Consider another example of 4 coverage levels comprising of: Coverage enhancement level 1 (CE1) comprising of SNR≥−6 dB at UE wrt its serving cell;
Coverage enhancement level 2 (CE2) comprising of −12 dB≤SNR<−6 dB at UE wrt its serving cell;
Coverage enhancement level 3 (CE3) comprising of −15 dB≤SNR<−12 dB at UE wrt its serving cell; and
Coverage enhancement level 4 (CE4) comprising of −18 dB≤SNR←15 dB at UE wrt its serving cell In the above example, CE1 may also be interchangeably called as normal coverage level, baseline coverage level, reference coverage level, legacy coverage level etc. On the other hand CE2-CE4 may be termed as enhanced coverage or extended coverage level/s.

Alternative or additional methods in and/or for operating a UE of adapting cell identification procedure are described in the following. The UE, which may be served by a first network node, is adapted and/or configured to identify a new cell, and performs at least the following steps:
- determining a signal quality (Q1) of at least a first cell (cell1), which has already been identified by the UE;
- obtaining a signal quality (Q2) of a potential second neighbor cell (cell2), which is to be identified by the UE;
- determining a relation between at least Q1 and Q2;
- adapting a cell identification procedure to identify the potential cell2 based on the determined relation;
- Identifying cell2 based on the adapted procedure and;
- (Optionally) using the results of the identification of cell2 for one or more radio operations.

Generally, determining Q1 of a cell like cell1 may generally comprise measuring one or more signals received from that cell, e.g. cell1. For example, the UE may determine the signal qualities of one or more, e.g. all, already identified cells. Examples of signals to be measured for such determining comprise PSS/SSS, CRS etc. In one example, cell1 is a serving cell. In another example, cell1 is a non-serving cell. Determining may comprise determining signal qualities (Qj) of a plurality of already identified cells; a relation between Qj and Q2 may be determined accordingly.

Obtaining the signal quality (Q2) of a cell like cell2 may comprise one or more of the following:
- It may be based on a pre-defined value of Q2 e.g. pre-defined in the standard; and/or
- measuring one or more signals received from the cell, e.g. cell2; and/or
- receiving it from a network node e.g. from the first network node; and/or
- it may implicitly be based on the location of the UE with respect to that of the cell, e.g. cell2.

A comparison of and/or determining the relation between at least Q1 and Q2 (and/or one or more Qjs) for example may comprise one or more of the following:
- comparing their respective values;
- by obtaining a pre-defined relation between Q1 and Q2 (and/or comparing Q1 and/or Q2 with it and/or evaluating the pre-defined relation based on Q1/Q2/Qjs;
- by receiving an information about the relation from a network node e.g. from the first network node; and
- based on coverage level of the UE e.g. whether the UE is operating in normal coverage wrt certain cell (e.g. serving cell) or in enhanced coverage wrt certain cell (e.g. serving cell). The coverage levels for normal and enhanced coverage may be pre-defined or signaled to the UE by the network node.

The relation between Q1 and Q2 can be expressed by a function (F). For example can be a function of at least Q2, and/or Q2 can be a function of at least Q1 e.g. Q1=F(Q2, α) where a is a parameter such as a threshold. Specific examples of functions are: a function comparing Q1 and Q2 (and/or Qjs) and/or a difference value, e.g. Q1-Q2 (or Qjs-Q2 for all js), with respect to one or more threshold values, average (e.g. arithmetic average, weighted average etc.), maximum, minimum, xth percentile.

The UE may further determine the relation between the set Qj and Q2 by using one or more of the same mechanisms as stated above. In this case in one example the relation between set Qj and Q2 may be separately determined between Q2 and signal quality of each identified cell. In another example the relation between set Qj and Q2 may be determined between Q2 and aggregated value of set Qj. The aggregated value may be further determined based on a function. Examples of functions are average, maximum, minimum, xth percentile, median etc. The relation between Qj and Q2 can be expressed by a function (H) e.g. a function comparing Qj and Q1 with respect to one or more threshold values.

The UE may select one of the pluralities of relations between Q1 and Q2 (or between set Qj and Q2). The said selection depends on at least the values of Q1 and Q2. There are at least two such relations called hereinafter as:
- a first relation between at least Q1 and Q2 and
- a second relation between at least Q1 and Q2.

In some variants there may be a third relation between at least Q1 and Q2 and so on. In some variants the third relation between at least Q1 and Q2 can be any relation different than the first and the second relations.

A relation between Q1 (or Qj) and Q2 may for example generally indicate a range of Q2 falls in, e.g. a range of ratios relative to Q1, and/or a SINR/SIR/SNR range. A relation may be considered to generally define a condition which Q1 (or Qj) and Q2 have to fulfill or comply with to be considered to be related by the relation.

Generally, a comparison between Q1 and Q2 may comprise and/or include and/or be based on (and/or comprise evaluating and/or calculating and/or determining, e.g. for Q1 and Q2 and/or Qjs for all js) one or more such relations.

After determining one of the relations between Q1 and Q2 the UE may further adapt at least one procedure to identify cell2. The adaptation of the cell identification procedure may comprise selecting a cell identification procedure which corresponds to or is related to and/or based on the determined relation/s between Q1 and Q2. For example the UE, the UE may select or use:
- a first cell identification procedure if it determines that the Q1 and Q2 are related by the first relation; and
- a second cell identification procedure if it determines that the and Q2 are related by the second relation;

The UE may also apply:
- the first cell identification procedure for identifying cell2 if the UE is determined to be operating in a normal coverage wrt a certain cell e.g. wrt serving cell and
- the second cell identification procedure for identifying cell2 if the UE is determined to be operating in an enhanced coverage wrt a certain cell e.g. wrt serving cell.

In some variant the UE may select or use a third cell identification procedure if it determines that the Q1 and Q2 are related by the third relation.

Table 1 shows an example of a mechanism in a UE for selecting one of the at least two cell identification procedures based on the determined relation between Q1 and Q2. In table 1 the parameters G1 and G2 are signal quality thresholds. In the first procedure the UE may identify cell2 within time period (T1) whereas in the second procedure the UE may identify cell2 within time period (T2). In one example the time periods (aka cell identification delay) T1 and T2 may have different values. In another example the time periods (aka cell identification delay) T1 and T2 may have the same values. In one or both cases (i.e. same or different T1 and T2) the UE may search cell2 with the same or different rate e.g. once every 40 ms or every frame. Also, in one or both cases the UE may average or combine samples of the synchronization signal from cell2 using different averaging mechanisms or the same averaging mechanism. Examples of mechanisms are coherent or non-coherent averaging in time, coherent or non-coherent averaging in frequency, coherent or non-coherent averaging in time and frequency etc.

TABLE 1

Selection of cell identification procedure based on relation between Q1 and Q2

| Relation b/w Q1 and Q2 | Q1 of cell1 | Q2 of cell2 | Cell identification procedure |
|---|---|---|---|
| 1 | Q1 ≥ G1 | Q2 ≥ G1 | First procedure |
| 2 | G2 ≤ Q1 < G1 | G2 ≤ Q2 < G1 | Second procedure |

After selecting one of the at least two cell identification procedures the UE uses the selected procedure to identify cell2. During the cell identification procedure the UE first acquires timing and physical cell ID (PCI) of cell2 by performing correlation over synchronization signal (e.g. PSS/SSS) of cell2 by correlating the synchronization signal with pre-defined synchronization signal sequences. After acquiring the PCI the UE may further perform one or more radio measurements on identified cell2. Examples of such measurements are RSRP, RSRQ, RS-SINR, SINR, SNR etc.

The UE may further use the results of the cell identification of cell2 for one or more operational tasks. Examples of such tasks are cell change (e.g. handover, cell selection, cell reselection, RRC reestablishment etc.), determining UE position, reporting results or information related to the results to a network node (e.g. to serving cell), logging the results and reporting them to the network node at a future time, comparing the results with the measurement results of other cells such as of serving cell etc.

The relations between Q1 and Q2 and the corresponding cell identification procedures are further elaborated below with specific examples:

In an example in table 2 the UE selects the first or the second procedure to identify cell2 based on the determined relation #1 or #2 between Q1 and Q2. For example if Q1 and Q2 are both not less than −6 dB then the UE uses the first procedure to identify cell2 otherwise it uses the second procedure to identify cell2. As shown in table 2, the (measurement) time (T1) to identify cell2 based on the first procedure is shorter than the time (T2) to identify cell2 based on the second procedure.

TABLE 2

Selection between 2 cell identification procedures based on relation between Q1 and Q2

| Relation b/w Q1 and Q2 | Q1 of cell1 [dB] | Q2 of cell2 [dB] | Procedure type | Identification delay [ms] |
|---|---|---|---|---|
| 1 | Q1 ≥ −6 | Q2 ≥ −6 | First procedure | T1 = 1000 |
| 2 | −14 ≤ Q1 < −6 | −14 ≤ Q2 < −6 | Second procedure | T2 = 400000 |

In an example according to table, 3 the UE selects one of the first, the second and the third procedures to identify cell2 based on the determined relation #1, #2 or #3 between Q1 and Q2. The first and the second procedures are the same as in example 2. In the third procedure the UE may apply one or more advanced techniques or different procedure than in the first or second procedures depending on the Q1 and/or Q2. For example, the UE may apply interference mitigation receiver when identifying cell2 within T3. The interference mitigation receiver partially or fully cancels or mitigates interference received from other cells i.e. cells other than cell2. The value of T3 may depend on the type of technique used by the UE. For example if the UE applies interference mitigation receiver to identify cell2 then T3 can be 1000 ms.

TABLE 3

Selection between 3 cell identification procedures based on relation between Q1 and Q2

| Relation b/w Q1 and Q2 | Q1 of cell1 [dB] | Q2 of cell2 [dB] | Procedure type | Identification delay [ms] |
|---|---|---|---|---|
| 1 | Q1 ≥ −6 | Q2 ≥ −6 | First procedure | T1 = 1000 |
| 2 | −14 ≤ Q1 < −6 | −14 ≤ Q2 < −6 | Second procedure | T2 = 400000 |
| 3 | Different than relations #1 and #2 | | Third procedure | T3 |

In an example in table 4 the UE selects one of the first, the second, third and the fourth procedures to identify cell2 based on the determined relation #1, #2, #3 or #4 between Q1 and Q2. The first and the second procedures are the same as in example 2. In the third procedure the UE may apply one or more advanced techniques or different procedure than in the first or second procedures depending on the Q1 and/or Q2. For example, the UE may apply interference mitigation receiver when identifying cell2 within T3 as described also in example 3. The interference mitigation receiver partially or fully cancels or mitigates interference received from other cells i.e. cells other than cell2. The value of T3 may depend on the type of technique used by the UE. For example if the UE applies interference mitigation receiver to identify cell2 then T3 can be 1000 ms. In the fourth procedure the UE may identify cell2 during T4. The value of T2 may depend on the value of Q1. For example if Q1 is smaller than Q2 by some margin (e.g. 3 dB) then the UE may identify cell2 during T2=1000 ms.

TABLE 4

Selection between 4 cell identification procedures based on relation between Q1 and Q2

| Relation b/w Q1 and Q2 | Q1 of cell1 [dB] | Q2 of cell2 [dB] | Procedure type | Identification delay [ms] |
|---|---|---|---|---|
| 1 | Q1 ≥ −6 | Q2 ≥ −6 | First procedure | T1 = 1000 |
| 2 | −14 ≤ Q1 < −6 | −14 ≤ Q2 < −6 | Second procedure | T2 = 400000 |
| 3 | Q1 ≥ −6 | −14 ≤ Q2 < −6 | Third procedure | T3 |
| 4 | −14 ≤ Q1 < −6 | Q2 ≥ −6 | Fourth procedure | T4 |

In all the above examples the UE may also determine the relation between set Qj and Q2 instead of only between Q1 and Q2, and according select and apply the selected cell identification procedure for identifying cell2.

In all the above examples, Q1 and/or Q2 may express signal quality of one type of signal or signal qualities of plurality of signals. Examples of signals are synchronization signals (e.g. PSS, SSS, SCH etc), cell specific reference signals (CRS), channel state information RS (CSI-RS) etc. For example Q1 and Q2 may denote one or more of SINR, SNR, SCH Ês/Iot, CRS Ês/Iot CSI-RS Ês/Iot etc.

An identification delay mentioned herein may represent a measurement time for performing measurement/s for a CI procedure, in particular a minimum measurement time.

Methods in a UE of signaling information related to cell identification procedure are discussed in the following.

A variant is related to transmitting the information related to cell identification procedure described to other nodes in the network. Examples of other nodes are other UEs, ProSe UEs, ProSe Relay UEs, eNodeB, base station, access point core network nodes, positioning node, or any other node/s used for dedicated services such as self-organizing network (SON) node.

There are significant advantages in sharing the information related to cell identification procedure with other nodes.

Figure 4:
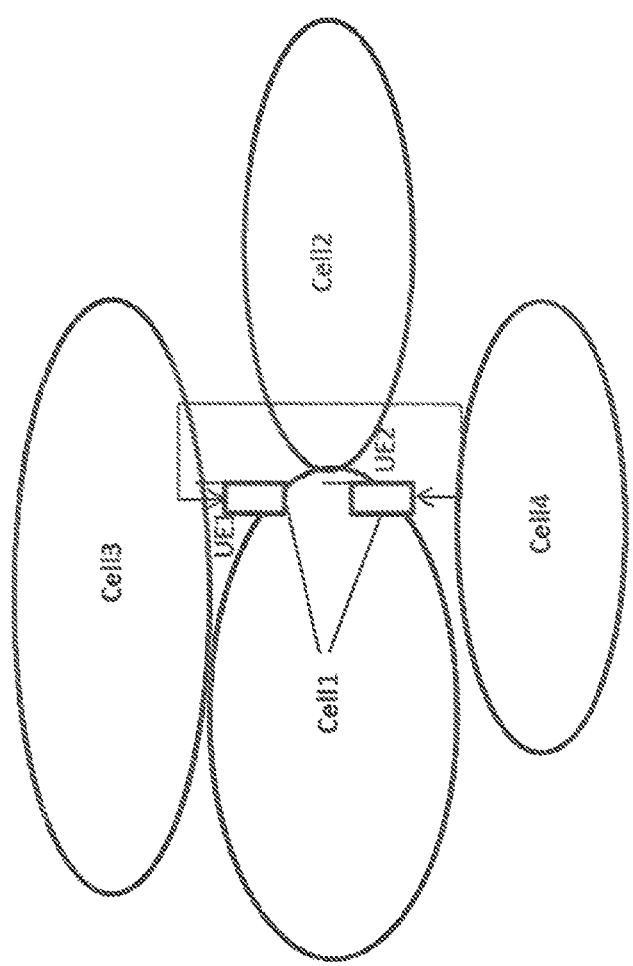
FIG. 4, showing a cell identification scenario.

In one example, UE1, which is located in a field, is operating under enhanced coverage and it has derived information related to cell identification as described in herein, and there is a second UE (UE2) which is also operating under enhanced coverage and has poor radio connection with its serving eNodeB. Since UE2 has poor connection to its serving cells or identified cell, there could be significant advantage if the UE1 could share the derived information with UE2 as it can use this information to adapt its cell identification procedure. This will help UE2 identify new cells which it was not capable of before because the same information may also be applicable to this coverage enhanced UE. UE1 signals information about the selected cell procedure to at least UE2. The information can comprise of one or more of: an identifier of the procedure, time period during which the cell is identified using the selected procedure etc. This example is illustrated in FIG. 4.

In a second example, sharing this type of information with other SON nodes may bring some advantages. The SON node may, based on determined quality of neighboring cells, activate or deactivate different procedures to enhance its operation.

UE could also derive and optimize its cell identification procedure periodically based on changes in the determined signal qualities of the cells. Deriving such information may be complex, and there could be a significant advantage of performing such complex tasks in one place and then sharing with other nodes.

Alternatively or additionally, there may be generally considered the following:

Discussion on Cell Search

Total Delay for Cell Search

The cell search procedure is carried out by UEs in RRC_CONNECTED state that have identified their serving cell. This procedure is used to detect neighbouring cells that can later be used to support functions such as mobility, ANR. The RRM measurements (e.g. RSRP/RSRQ which serve as basis for mobility decisions) can be carried out only when the new cells have been identified. A UE may be adapted for performing such cell search (or cell identification) procedure.

Total cell identification delay includes both time for detecting a cell (i.e. acquisition of Physical Cell ID) and time for performing a single measurement as shown herein.

Total cell search delay=PCI acquisition (PSS/SSS acquisition)+1 single measurement performed on identified cell The legacy requirement is defined for the case with 2 receive antennas, and it comprises 600 ms of PCI acquisition time and 200 ms L1 measurement period; a total cell search delay is 800 ms.

Cell search was also studied for Rel-12 category 0 UEs comprising 1Rx in. For this type of UEs, PCI acquisition time was still defined as 600 ms, but the measurement period was extended from 200 ms to 400 ms resulting in a total cell search delay of 1000 ms.

Simulation Assumptions

Relevant parts of the simulation assumptions for cell search for UEs under enhanced coverage are summarized in Table A below.

TABLE A

| Link Simulation Parameters | | | | |
|---|---|---|---|---|
| Parameter | Unit | Cell 1 | Cell 2 | Cell 3 |
| E-UTRA RF Channel number | — | Channel 1 | Channel 1 | Channel 1 |
| Carrier frequency | GHz | 2 GHz | 2 GHz | 2 GHz |
| Data and Control PSD relative to RS PSD | dB | 0 | 0 | 0 |
| PSS and SSS PSD relative to AS PSD | dB | 0 | 0 | 0 |
| Number of RB's | | 6 | 6 | 6 |
| RB Utilization | % | 100 | 100 | 100 |
| Data Modulation | — | QPSK | QPSK | QPSK |
| Frame Structure Type | — | 1 (FDD) | 1 (FDD) | 1 (FDD) |
| CP Length | — | Normal | Normal | Normal |
| DRX | | OFF | OFF | OFF |
| Frequency Offset relative to UE frequency reference | Hz | 0 | 0 | 0 |
| 1) Relative Delay of $1^{st}$ Path (synchronous) | μs | 0 | 0 | CP/2 |
| 2) Relative Delay of $1^{st}$ Path (asynchronous): Fixed delay | ms | 0 | 1.5 | 3.0 |
| Es/Noc | dB | −4.82 | −9.71 | Test 1: −6.45<br>Test 2: −8.45<br>Test 3: −10.45 |

TABLE A-continued

Link Simulation Parameters

| Parameter | Unit | Cell 1 | Cell 2 | Cell 3 |
|---|---|---|---|---|
| | | | | Test 4: −13.45 |
| | | | | Test 5: −16.45 |
| Number of Tx antennas | — | 1 | 1 | 1 |
| PSS Sequence ID | — | See Table 3, 4 | See Table 3, 4 | See Table 3, 4 |
| SSS Sequence ID | — | See Table 3, 4 | See Table 3, 4 | See Table 3, 4 |
| Propagation Condition | — | AWGN, EPA5, ETU30, EPA1, ETU1 | | |
| Noise Model | — | AWGN | | |

NOTE:
Noc value doesn't include the three simulated eNB signals' power

Simulation Results

In this section cell search delay results according to the simulation assumptions in Table A are provided.

Figure 1B:
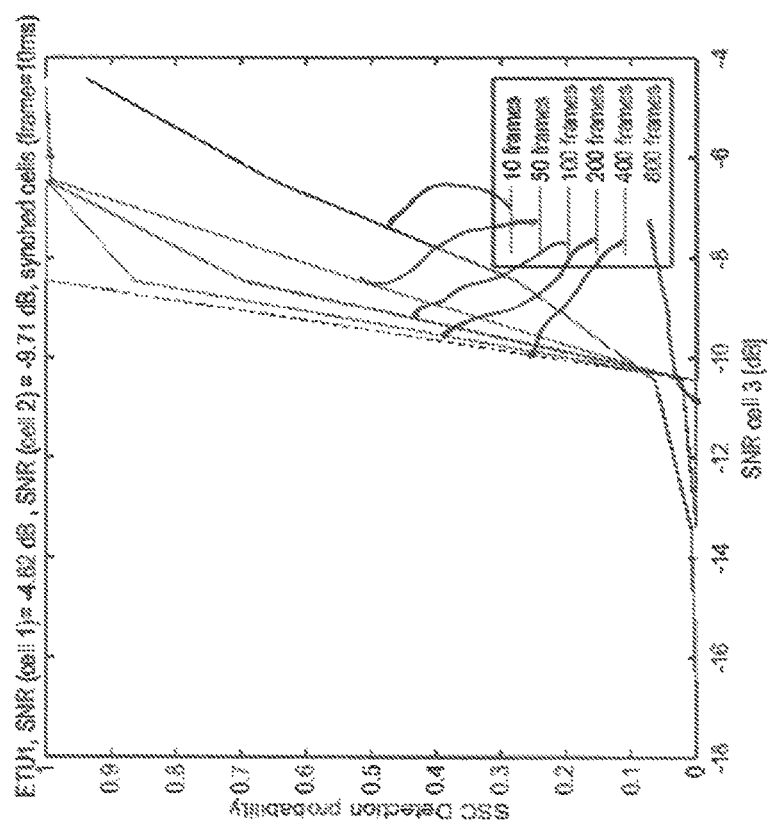

FIG. 1 shows SSCH detection delay for Rel-13 MTC UEs under EPA1 (FIG. 1a) and ETU1 (FIG. 1b) channels for different SNR conditions of the target cell according to Table A for synchronized cells.

FIG. 1 shows the SSCH detection delay, i.e. the SSS detection of the target cell for varying number of SNR levels for the case when the cells are synchronized according to Table A for EPA1 (FIG. 1a) and ETU1 (FIG. 1b) channels. AWGN results have been excluded herein because that is an ideal channel and may not correspond to a realistic scenario in which the channels change slowly over time even if the UE stationary. In a typical enhanced coverage scenario, the UE is expected to be in a fixed position e.g. at a basement, mounted on a wall, or at fields monitoring the changes in e.g. temperature. In all these cases, the surroundings change, and therefore it is natural to study the performance under EPA1 and ETU1 channels. Also, it is focused on SSS detection performance, which is more difficult than performance regarding PSS. If the UE is able to detect SSS, it is natural to assume that the same UE is able to detect PSS.

It is observed from that SSCH detection becomes a challenge at low SNR levels. In these results it is assumed that a UE does one cell search attempt in every radio frame. But the same principle applies if the UE intends to search less frequently, e.g. every 40 ms. In this case, the number of frames have to be scaled with 4. It is observed from FIG. 1 that the overall performance of EPA1 and ETU1 is the same. Typically, in RAN4 (pertaining to layer 4 of LTE RAT), 90% detection probability is considered when defining the requirements. These results show that even when averaging is done over a long period, a UE cannot detect a cell that is below −8 dB SNR. For this case, it is assumed that the UE searches over 400 continuous frames corresponding to continuous search over 4 seconds.

Observation #1: Neighboring cells can be detected down to −8 dB SNR assuming the simulation assumptions in Table A.

An interesting observation from these results is that SSCH detection probability decreases dramatically below −8/−9 dB SNR. The reason is that down to this SNR level, the target cell (cell3) SNR is higher than the SNR level of the second cell (cell2) or in the same range as cell2. But below −9 dB SNR, the signal quality of cell2 becomes much stronger than the target cell (cell3) which makes it difficult for the UE to detect the peaks in the received signal quality from cell3 that contains the desired SSCH. Since SSC codes are not perfectly orthogonal, a strong SSC index may give rise to "ghost peaks" corresponding to fictive cells. It shall be noted that a simple cell search algorithm without IC was used.

Another important reflection on these results is that for an enhanced coverage UE, this scenario of attempting to detect a cell that has a much weaker signal strength than signal strengths of two already detected cells may not be very useful and not efficient neither for the UE nor for the eNodeB. An MTC device shall always connect to the strongest cell. Otherwise, transmissions from both the UE and the eNodeB have to be repeated which becomes a waste of resources compared to the case if the UE was connected to the much stronger cell. Therefore, the SNR levels in Table A above have been modified to correspond to a more realistic scenario as shown in Table B below. These SNR values correspond to the case when an enhanced coverage UE at low SNR level attempts to detect neighbouring cells, and results are shown in FIGS. 2 and 3.

TABLE B

Modified SNR values of neighbouring cells to correspond to a realistic scenario

| Es/Noc | dB | −18 | −22 | Test 1: −6.45 |
|---|---|---|---|---|
| | | | | Test 2: −8.45 |
| | | | | Test 3: −10.45 |
| | | | | Test 4: −13.45 |
| | | | | Test 5: −16.45 |

Figure 2A:
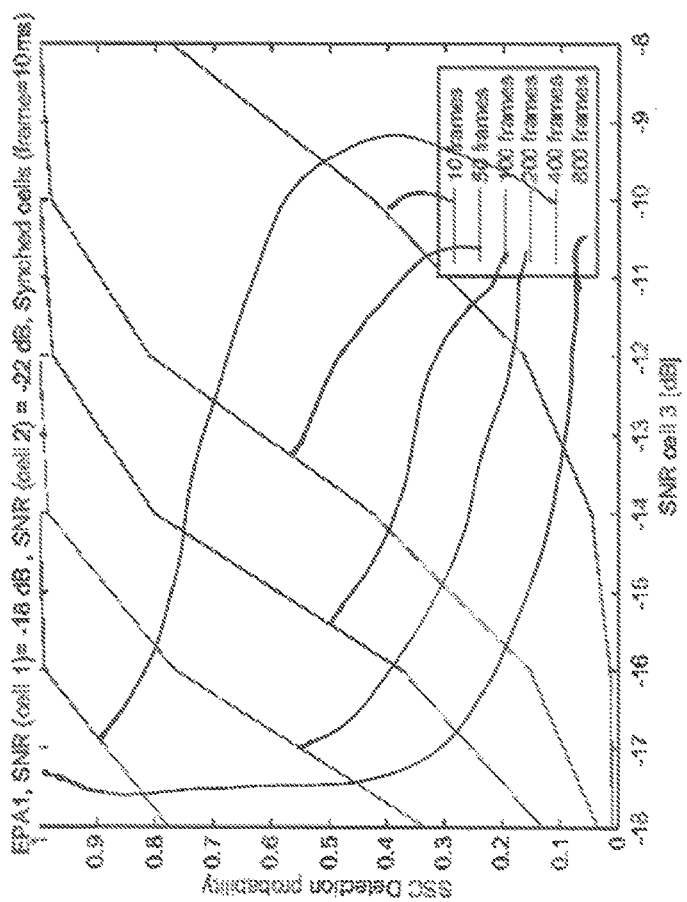
FIG. 2 (*a/b*), showing further simulation results regarding cell search.
Figure 2B:
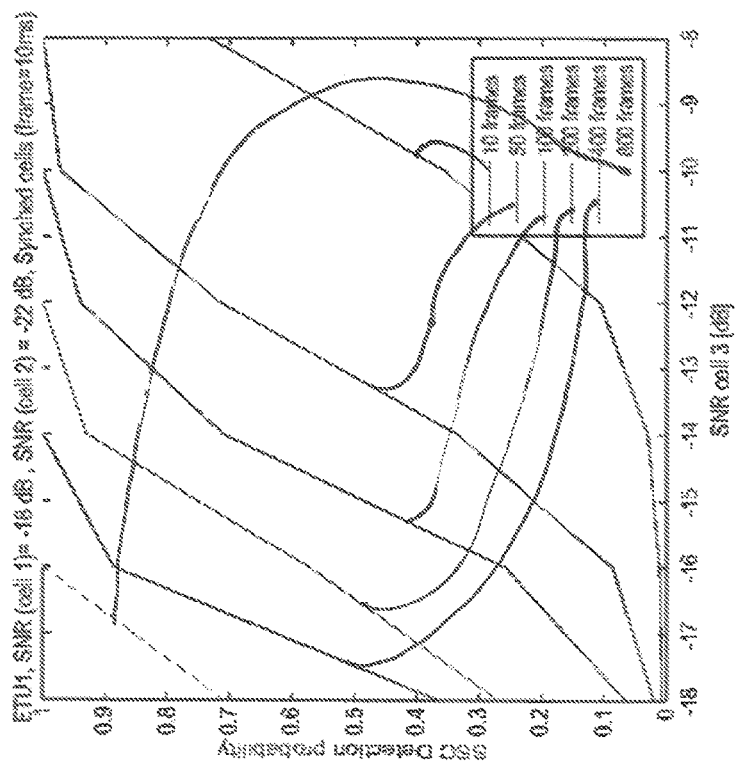

FIG. 2 shows SSCH detection delay for Rel-13 MTC UEs under EPA1 (FIG. 2a) and ETU1 (FIG. 2b) channels for different SNR conditions of the target cell according to Table B for synchronized cells.

Figure 3A:
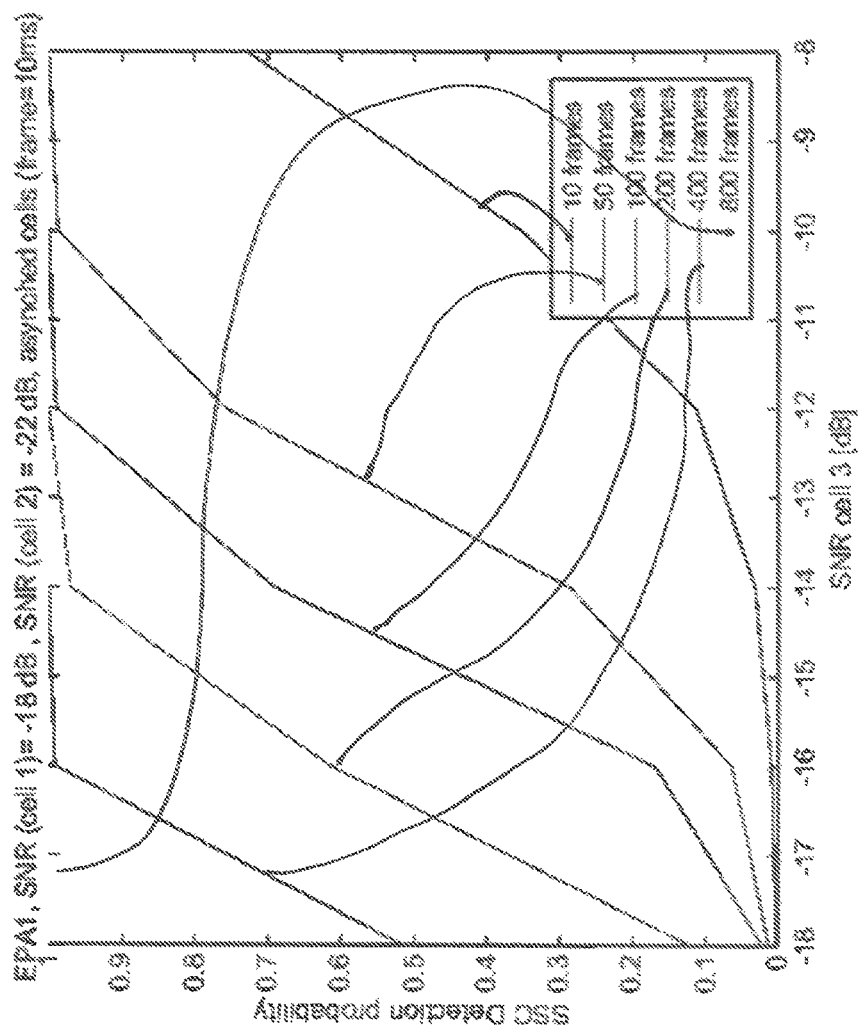
FIG. 3 (*a/b*), showing further simulation results regarding cell search
Figure 3B:
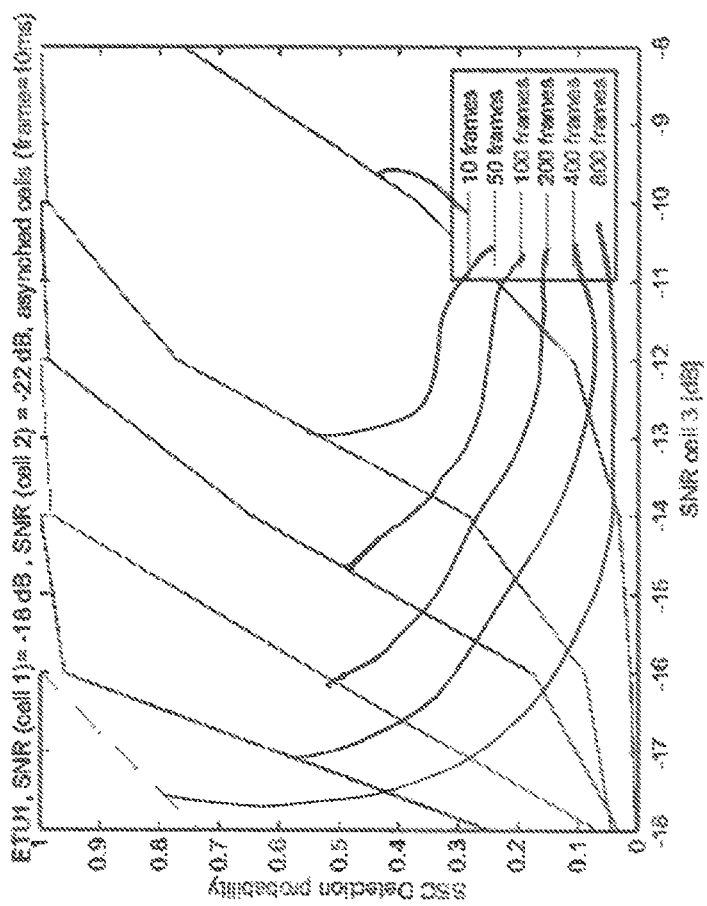

FIG. 3 shows SSCH detection delay for Rel-13 MTC UEs under EPA1 (FIG. 3a) and ETU1 (FIG. 3b) channels for different SNR conditions of the target cell according to Table B for asynchronized (not synchronized) cells.

FIG. 2 (a/b) shows the SSCH detection delay, i.e. the SSS detection of the target cell for varying number of SNR levels for the case when the cells are synchronized and for the SNR values in Table B. The results are shown for EPA1 and ETU1 channels. Similarly, FIG. 3 (a/b) shows the corresponding results asynchronous case. These figures show that EPA1 and ETU1 results have similar performance and the reason is that the channel is dominated by the AWGN noise at such low SNR levels. Also the Doppler shift between these two channels is very low, hence similar results appear.

In both cases, the target cell can be detected down to at least −16 dB using longer averaging, e.g. over 800 frames. The results show that the detection probability increases with averaging time/frames down to a certain SNR level, and then below that level the channel is dominated by the noise.

Observation #2: Neighboring cells can be detected down to at least −16 dB SNR when accumulation is done over a long time period for SNR values of neighbor cells in Table B.

By comparing the results in FIG. 2-3 to the results in FIG. 1, it is seen that there is a relation between the signal strength of already detected cells and the cell to be detected. This figure shows that the UE is able to detect a weaker cell with good probability as long as the signal quality of that cell is below or in the same range as the two already detected cells. The overall trend of the results can be summarized as in Table C below.

The final cell search requirement defined will depend on the relation between the already identified cell/s and the target cell to be detected. The UE is required to detect and measure on up to 8 neighboring cells provided that they are detectable. A cell is considered to be detectable according to SCH_RP and SCH Ês/Iot requirements as laid out in Annex B.2.1 of TS 36.133. This means that the detection probability of the target cell may depend on the SNR levels of the already detected cells.

TABLE C

UEs ability to detect new cells

| SCH Ês/Iot of already identified cells including serving cell: Q1 | Target cell SCH Ês/Iot: Q2 | Detection delay |
|---|---|---|
| −15 ≤ Q1 < −6 | Q2 ≥ −6 | 400 s |
| Q1 ≥ −6 | Q2 ≥ −6 | Requirements in 8.11.2 apply |

Observation #3: A UE is able to detect target cell as long as the signal quality of target cell is below or in the same range as the signal quality of already detected cells assuming the simulation assumptions in Table B.

Cell search accumulation is typically done every 40 ms by the UE. The results shown assume accumulation in every radio frame. This may not be necessary for an enhanced coverage UE, which is expected to be stationary, and also it may not be very efficient from a power consumption perspective (avoiding repetitions). Also since the UE may already operate at very low SNR level, it may not be necessary to look for other cells which are much weaker in signal strength.

In addition, since the enhanced coverage UEs are expected to be typically stationary and may not require frequent and/or large amount of data transmissions, this type of UEs may not need to search as frequently as a normal coverage UEs that requires higher mobility support. Therefore the cell search delay may not be an issue and the UE can afford to search over long time period.

Considering all these aspects, it may be sufficient for the UE to search more sparsely. Thus assuming that the cell search is done every 1 second and 400 frames are necessary, the PSS/SSS acquisition delay can be defined as 400 seconds. Thus, one or more parameters of cell search as example of, or as part of, a cell identification procedure, may depend on or based on coverage level and/or signal quality of a first cell (already detected) and a second cell (which may be the cell searched, or a second already detected cell). Delay and/or frame number may be considered as parameters of a CI procedure.

Proposal #1: PSS/SSS acquisition delay can be defined as 400 seconds for the UEs operating under enhanced coverage.

The cell search performance for Rel-13 MTC UEs that operate under enhanced coverage has been analysed. It has been observed that detection of new cells that have much weaker signal strength than already detected cells is difficult. On the other hand, it was observed that identifying of much weaker cells than the already identified cells when the UE operates under enhanced coverage may not be useful or efficient from a resource perspective for eNB, but also for UE. The observations and proposal made comprise:

Observation #1: Neighboring cells can be detected down to −8 dB SNR assuming the simulation assumptions in Table A.

Observation #2: Neighboring cells can be detected down to at least −16 dB SNR when accumulation is done over a long time period for SNR values of neighbor cells in Table B.

Proposal #1: PSS/SSS acquisition delay can be defined as 400 seconds for the UEs operating under enhanced coverage.

There may generally be considered a UE adapted for operation according to one of the proposals described herein. A method for operating a UE according to one of the proposal described herein may be envisioned.

There may generally be considered, alternatively and/or as representatives of the method for operating a UE:

E1 A method of operating a UE and/or a method in a UE capable of identifying a new cell, the method comprising the steps of:
  Determining a signal quality (Q1) of at least a first identified cell (cell1);
  Obtaining a signal quality (Q2) of a second cell2;
  Determining a relation between Q1 and Q2;
  Adapting a procedure for identifying cell2 based on at least the determined relation between Q1 and Q2; and
  Identifying cell2 based on the adapted procedure.

E2 The method of E1, wherein the adaptation of the procedure further comprising:
  Selecting a first procedure for identifying cell2 when Q1 and Q2 are related by a first relation;
  Selecting a second procedure for identifying cell2 when Q1 and Q2 are related by a second relation.

E3 The method of claim E1 or E2, further comprising:
  Determining the first relation when:
  Q1≥threshold1 and Q2≥threshold1; and
  Determining the second relation when:
  (threshold1<Q1≤threshold2) and —(threshold1<Q2≤threshold2);

E4 The method of any of E1 to E3, further comprising:
  Determining a third relation between Q1 and Q2, said third relation being different than the first and the second relations; and
  Selecting a third procedure for identifying cell2 based on the determination of the third relation between Q1 and Q2.

E5 The method of any of E1 to E4, wherein in the first procedure cell2 is identified over a shorter time (T1) compared to the time required (T2) for identifying cell2 based on the second procedure.

E6 The method of any of E1 to E5, wherein in the first procedure the UE searches cell2 at a first rate e.g. every 40 ms, whereas in the second procedure the UE searches cell2 at a second rate e.g. every 10 ms.

E7 The method of any of E1 to E6, wherein in the third procedure the UE searches cell2 over time period (T3), which can be same as T1 or T2 or different than T1 and T2.

E8 The method of any of E1 to E7, wherein cell1 is a serving cell.

E9 The method of any of E1 to E8, further comprising:
Determining a signal quality (Q3) of a third identified cell (cell3);
Determining a relation between Q1, Q2 and Q3;
Further adapting the procedure for identifying cell2 based on the determined relation.

E10 The method of any of E1 to E9, wherein determining the relation between Q1, Q2 and Q3 further comprising:
determining an aggregated or overall value (Qj) of Q1 and Q3 and determining a relation between Qj and Q2;

E11 The method of any of E1 to E10, further comprising:
Determining a coverage level of the UE wrt serving cell and/or cell2.
Further adapting the procedure for identifying cell2 based on the determined coverage level.

E12 The method of any of E1 to E11, further comprising:
Selecting the first procedure for identifying cell2 when the determined coverage level is below a signal threshold3 e.g in normal coverage;
Selecting the second procedure for identifying cell2 when the determined coverage level is above a signal threshold3 e.g. enhanced coverage.

E13 The method of any of E1 to E12, further comprising:
Using the results of the identification of cell2 for one or more operational tasks (e.g. reporting results to a network node, performing cell change etc).

Figure 5:
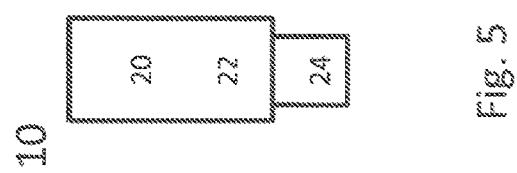
FIG. 5, showing an exemplary terminal or UE.

FIG. 5 schematically shows a terminal 10, which may be implemented in this example as a user equipment. Terminal 10 comprises control circuitry 20, which may comprise a controller connected to a memory. A module, e.g. an identifying module and/or comparing module, of the terminal or UE may be implemented in and/or executable by, the control circuitry 20, in particular as module in the controller. Terminal 10 also comprises radio circuitry 22 providing receiving and transmitting or transceiving functionality, the radio circuitry 22 connected or connectable to the control circuitry. An antenna circuitry 24 of the terminal 10 is connected or connectable to the radio circuitry 22 to collect or send and/or amplify signals. Radio circuitry 22 and the control circuitry 20 controlling it are configured for cellular communication with a network on a first cell/carrier and a second cell/carrier, in particular utilizing E-UTRAN/LTE resources as described herein. The terminal 10 may be adapted to carry out any of the methods for operating a terminal disclosed herein; in particular, it may comprise corresponding circuitry, e.g. control circuitry. In particular, the terminal may represent a M2M device or low cost UE.

Figure 6:
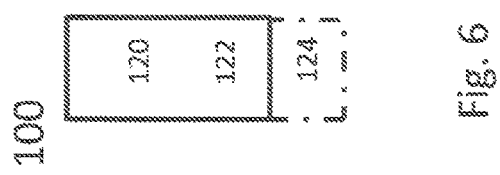
FIG. 6, showing an exemplary network node.

FIG. 6 schematically show a network node or base station 100, which in particular may be an eNodeB, for example a MeNB or SeNB. Network node 100 comprises control circuitry 120, which may comprise a controller connected to a memory. Any module of the network node 100, e.g. a configuring module and/or transmitting module, may be implemented in and/or executable by the control circuitry 120. The control circuitry is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry.

Figure 7:
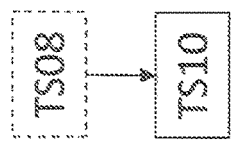
FIG. 7, showing a flow diagram of an exemplary method for operating a terminal or UE.

FIG. 7 shows a flow diagram (or algorithm) of an exemplary method for operating a terminal or UE, which may be an implementation of any terminal or UE discussed herein. The method comprises an action TS10 of performing a cell identification procedure based on a comparison between a signal quality of a first cell and the signal quality of a second cell. The method may optionally comprise an action TS08 of comparing the signal quality of the first cell and the signal quality of the second cell. Alternatively, a comparison may be implicit, and/or the comparison (respectively, an indication of the comparison or its result) may be indicated to the terminal or UE, e.g. by another terminal or UE or network node. The terminal or UE and/or may receive such an indication, e.g. in an action of the method.

Figure 8:
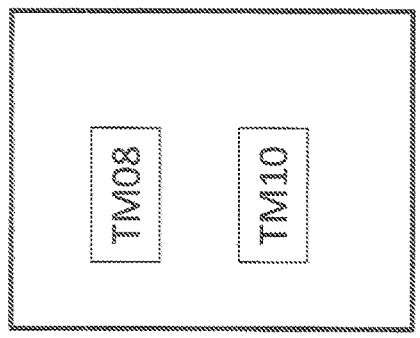
FIG. 8, showing an exemplary terminal or UE.

FIG. 8 shows an exemplary terminal or UE, which may be an implementation of any terminal or UE discussed herein. The terminal or UE may comprise a identifying or identification module TM10 for performing action TS10. It may be considered that the terminal or UE comprises an optional comparing or comparison module TM08 for performing action TS08, and/or a receiving module for receiving an indication of the comparison and/or its result.

Figure 9:
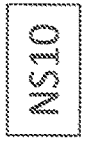
FIG. 9, showing a flow diagram of an exemplary method for operating a network node.

FIG. 9 shows a flow diagram of an exemplary method for operating a network node, which may be an implementation of any of the network nodes described herein. The method may comprise an action NS10 of configuring a user equipment or terminal for performing a method for operating a user equipment or terminal as described herein. Configuring may comprise transmitting related information and/or configuration data to the user equipment or terminal.

Figure 10:
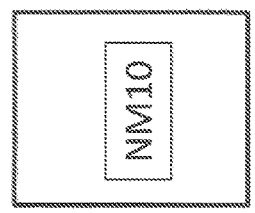
FIG. 10, showing an exemplary network node.

FIG. 10 shows an exemplary network node, which may be an implementation of any network node described herein. The network node may comprise a configuring module NM10 for performing action NS10.

Generally, there may be considered a network node adapted for performing any one of the methods for operating a network node described herein.

There may be considered a terminal or UE adapted for performing any one of the methods for operating a terminal described herein.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may involve one or more than one terminal connected to a wireless communication network and/or more than one node of a wireless communication network and/or in a wireless communication network. It may be envisioned that a node in or for communication, and/or in, of or for a wireless communication network is adapted for communication utilizing one or more RATs, in particular LTE/E-UTRA.

A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header. Each node or terminal involved in communication may comprise radio circuitry and/or control circuitry and/or antenna circuitry, which may be arranged to utilize and/or implement one or more than one radio access technologies. Radio circuitry of a node or terminal may generally be adapted for the transmission and/or reception of radio waves, and in particular may comprise a corresponding transmitter and/or receiver and/or transceiver, which may be connected or connectable to antenna circuitry and/or control circuitry. Control circuitry of a node or terminal may comprise a controller and/or memory arranged to be accessible for the controller for read and/or write access. The controller may be arranged to control the communication and/or the radio circuitry and/or provide additional services. Circuitry of a node or terminal, in particular control circuitry, e.g. a controller, may be programmed to provide the functionality described herein.

A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered.

A node of a wireless communication network may be implemented as a terminal and/or user equipment and/or network node and/or base station (e.g. eNodeB) and/or relay node and/or any device generally adapted for communication in a wireless communication network, in particular cellular communication.

A wireless communication network or cellular network may comprise a network node, in particular a radio network node, which may be connected or connectable to a core network, e.g. a core network with an evolved network core, e.g. according to LTE. A network node may e.g. be a base station. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation.

A terminal may be implemented as a user equipment; it may generally be considered that a terminal is adapted to provide and/or define an end point of a wireless communication and/or for a wireless communication network. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or user equipment is adapted for one or more RATs, in particular LTE/E-UTRA.

It may be considered that a terminal or user equipment comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN. Generally, a terminal may be adapted to support dual connectivity. It may comprise two independently operable transmitter (or transceiver) circuitries and/or two independently operable receiver circuitries; for dual connectivity, it may be adapted to utilize one transmitter (and/or receiver or transceiver, if provided) for communication with a master network node and one transmitter (and/or receiver or transceiver, if provided) for communication with a secondary network node. It may be considered that a terminal comprises more than two such independently operable circuitries. A terminal or UE may be adapted for MTC and/or comprise a corresponding MTC module. It may be considered that a terminal or UE is a M2M device, in particular a device adapted for M2M communication or MTC.

A network node or base station, e.g. an eNodeB, may be any kind of base station of a wireless and/or cellular network adapted to serve one or more terminals or user equipments. It may be considered that a base station is a node or network node of a wireless communication network. A network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry.

A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station. A network node or base station may generally be adapted to allocate and/or schedule time/frequency resources of a network and/or one or more cells serviced by the base station. An eNodeB (eNB) may be envisioned as an example of a base station, e.g. according to an LTE standard. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a controlling node and/or coordinating node and/or to allocate resources in particular for cellular communication via one or more than one cell. A network node may be a base station like an eNodeB and/or a relay node. It may be considered that a network node is adapted for M2M communication and/or MTC, e.g. via a M2M module of the node. A network node may generally be adapted to provide, and/or provide, a cell, e.g. a serving cell. The network node may comprise a cell module for such providing.

A terminal being configured with a cell and/or carrier, and/or being connected to a network node via a cell, may be in a state in which it may communicate (transmit and/or receive data, e.g. with the network node) using the cell or carrier, e.g. being registered with the network for communication and/or being synchronized to the cell and/or carrier; in particular, the cell may be activated for the terminal.

There is also disclosed a program product comprising code executable by control circuitry, the code causing the control circuitry to carry out and/or control any one of the method for operating a terminal or network node as described herein, in particular if executed on control circuitry, which may be control circuitry of a terminal or a network node as described herein.

Moreover, there is disclosed a carrier medium carrying and/or storing at least any one of the program products described herein and/or code executable by control circuitry, the code causing the control circuitry to perform and/or control at least any one of the methods described herein. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

Resources or communication resources may generally be frequency and/or time resources, which may comprise e.g. frames, subframes, slots, resource blocks, carriers, subcarriers, channels, frequency/spectral bands, etc. Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information.

Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. a network node or allocation node, e.g. a base station, may be adapted to determine and/or transmit corresponding allocation or scheduling data, e.g. data indicating release or de-allocation of resources and/or scheduling of UL and/or DL resources. Accordingly, resource allocation may be performed by the network and/or by a network node; a network node adapted for providing resource allocation/scheduling for one or more than one terminals may be considered to be a controlling node. Resources may be allocated and/or scheduled on a cell level and/or by a network node servicing and/or providing the cell.

Allocation data may be considered to be data indicating and/or granting resources allocated by a network node, e.g. a controlling and/or allocation node, in particular data identifying or indicating which resources are reserved or allocated, e.g. for cellular communication, which may generally comprise transmitting and/or receiving data and/or signals; the allocation data may indicate a resource grant or release and/or resource scheduling. A grant or resource grant may be considered to be one example of allocation data. It may be considered that an allocation node is adapted to transmit allocation data directly to a node and/or indirectly, e.g. via a relay node and/or another node or base station. Allocation data may comprise control data and/or be part of or form a message, in particular according to a pre-defined format, for example a DCI format, which may be defined in a standard, e.g. LTE. In particular, allocation data may comprise information and/or instructions to reserve resources or to release resources, which may already be allocated. A terminal may generally be adapted to perform transmission of data to, e.g. UL data, and/or reception of data from, a network node and/or to more than one network nodes, according to allocation data.

Configuring a terminal or UE, by a network or network node, may comprise transmitting, by the network or network node, one or more parameters and/or commands and/or allocation data (which may comprise such parameter/s and/or command/s to the terminal or UE. It may be envisioned that configuring the terminal or UE comprises the terminal or UE changing it configuration and/or setup based on such received allocation data and/or parameters and/or commands from the network and/or the network node. A terminal or UE configured for and/or with a functionality and/or a configuration may be set up to perform and/or according such functionality, e.g. based on such configuring. A configuration may be described and/or be represented by such parameter/s and/or command/s and/or allocation data.

Some useful abbreviations comprise:

| Abbreviation | Explanation |
| --- | --- |
| BS | Base Station |
| CRS | Cell-specific Reference Signal |
| D2D | Device-to-Device, direct device communication |
| DL | Downlink |
| DRX | Discontinuous Reception |
| E-CID | Enhanced CID |
| eNodeB | evolved Node B |
| LTE | Long-Term Evolution |
| MDT | Minimization of Drive Tests |
| MSR | Multi-Standard Radio |
| PCI | Physical Cell Identity |
| ProSE | Proximity Services, D2D for LTE |
| RF | Radio Frequency |
| RRC | Radio Resource Control |
| RSRP | Reference Signal Received Power |
| RSRQ | Reference Signal Received Quality |
| RSSI | Received Signal Strength Indicator |
| RX | receiver (circuitry), pertaining to a receiver |

-continued

| Abbreviation | Explanation |
| --- | --- |
| SINR | Signal-to-Interference and Noise Ratio |
| SIR | Signal-to-Interference Ratio |
| SNR | Signal-to-Noise Ratio |
| SON | Self-Optimized Network |
| UE | User Equipment |
| UL | Uplink |
| HO | Handover |
| M2M | machine to machine |
| MTC | Machine type communication |

The acronyms or abbreviations used herein may be according to LTE standard usage.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

The invention claimed is:

1. A method of operating a user equipment (UE) in a wireless communication network, the UE being in enhanced coverage with a first cell of the wireless communication network, the method comprising:

measuring a signal quality of the first cell and measuring a signal quality of a second cell of the wireless communication network;

configuring a cell identification procedure with respect to the second cell in dependence on a comparison of the measured signal qualities of the first and second cells;

performing the cell identification procedure for the second cell, the cell identification procedure including at least one of performing synchronization with respect to the second cell and determining a physical cell identity of the second cell, based on evaluating one or more signals received at the UE from the second cell.

2. The method according to claim 1, wherein configuring the cell identification procedure comprises configuring one or more parameters that govern performance of the cell identification procedure.

3. The method according to claim 2, wherein configuring the cell identification procedure comprises adapting at least one of a minimum measurement time and a time allowed to measure on the second cell.

4. The method according to claim 1, wherein the comparison comprises at least one of a comparison of the signal qualities of first and second cells to one another and respective comparisons of the signal qualities of the first and second cells to one or more defined signal quality thresholds or ranges.

5. The method according to claim 1, wherein configuring the cell identification procedure comprises selecting between a first cell identification procedure and a second cell identification procedure, wherein the first and second cell identification procedures are distinguished in terms of respective measurement times allocated for performing measurements on the one or more signals of the second cell.

6. The method according to claim 1, wherein signal quality as measured by the UE for the first and second cells is represented by any one or more of: a signal-noise ratio (SNR), a signal-to-interference-and-noise ratio (SINR), a channel quality indicator (CQI), a reference signal received quality (RSRQ), a CRS Ês/Iot, and a SCH Ês/Iot.

7. A user equipment (UE) configured for operation in a wireless communication network, the UE comprising:

radio circuitry configured for wirelessly communicating with the wireless communication network, including transmitting and receiving signals in one or more cells of the wireless communication network; and control circuitry operatively associated with the radio circuitry and configured to:

measure a signal quality of a first cell of the wireless communication network, the UE being in enhanced coverage with the first cell, and measure a signal quality of a second cell of the wireless communication network;

configure a cell identification procedure with respect to the second cell in dependence on a comparison of the signal qualities of the first and second cells; and perform the cell identification procedure for the second cell, the cell identification procedure including at least one of performing synchronization with respect to the second cell and determining a physical cell identity of the second cell, based on evaluating one or more signals received at the UE from the second cell.

8. The UE according to claim 7, wherein the control circuitry is configured to configure the cell identification procedure by configuring one or more parameters that govern performance of the cell identification procedure.

9. The UE according to claim 8, wherein the control circuitry is configured to configure the cell identification parameter by adapting at least one of a minimum measurement time and a time allowed to measure on a cell.

10. The UE according to claim 7, wherein the comparison comprises at least one of a comparison of the signal qualities of the first and second cells to one another and respective comparisons of the signal qualities of the first and second cells to one or more defined signal thresholds.

11. The UE according to claim 7, wherein the control circuitry is configured to configure the cell identification procedure by selecting between a first cell identification procedure and a second cell identification procedure, wherein the first and second cell identification procedures are distinguished in terms of respective measurement times allocated for performing measurements on the one or more signals of the second cell.

12. The UE according to claim 7, wherein signal quality as measured by the UE for the first and second cells is represented by any one or more of: a signal-noise ratio (SNR), a signal-to-interference-and-noise ratio (SINR), a channel quality indicator (CQI), a reference signal received quality (RSRQ), a CRS Ês/Iot, and a SCH Ês/Iot.

13. A network node configured for operation in a wireless communication network, the network node comprising:
 communication circuitry configured for communicating with User Equipments (UEs) operating in the wireless communication network; and
 control circuitry configured to:
  determine a signal quality of a User Equipment (UE) with respect to first and second cells of the wireless communication network, the UE being in enhanced coverage with respect to the first cell;
  determine a configuration to be used by the UE for performing a cell identification procedure with respect to the second cell, based on a comparison of signal qualities of the first and second cells; and
  transmit, via the communication circuitry, signaling to the UE indicating the configuration, to thereby cause the UE to perform the cell identification procedure for the second cell according to the configuration.

14. A User Equipment (UE) configured for operation in a wireless communication network and comprising:
 radio circuitry configured for wireless communication with radio network nodes in the wireless communication network; and
 control circuitry configured to:
  receive signaling indicating that a cell identification procedure is to be performed for a second cell of the wireless communication network, the second cell neighboring a first cell of the wireless communication network that is serving the UE;
  determining a period to use for the cell identification period in dependence at least on a signal quality of the second cell as compared to one or more signal quality thresholds that define one or more corresponding levels of enhanced coverage, so that the UE uses a longer period if the signal quality does not exceed a certain defined signal quality threshold and uses a shorter period if the signal quality exceeds the certain defined quality threshold; and
  performing the cell identification procedure for the second cell, according to the determined period.

* * * * *